United States Patent [19]

Paire

[11] Patent Number: 5,236,769
[45] Date of Patent: Aug. 17, 1993

[54] FIRE-RESISTANT COMPOSITE LINING FOR A GARMENT

[75] Inventor: Christian Paire, Roisel, France

[73] Assignee: Lainiere De Picardie, Peronne, France

[21] Appl. No.: 822,584

[22] Filed: Jan. 17, 1992

[30] Foreign Application Priority Data

Feb. 25, 1991 [FR] France .................. 91 02215

[51] Int. Cl.[5] .................. A41D 27/02; B32B 5/06; B32B 5/26
[52] U.S. Cl. .................. 428/196; 2/7; 2/97; 2/272; 428/197; 428/198; 428/234; 428/235; 428/286; 428/287; 428/300; 428/315.9; 428/317.1
[58] Field of Search .................. 2/7, 97, 272; 428/196, 428/197, 198, 234, 235, 286, 287, 300, 315.9, 317.1

[56] References Cited

U.S. PATENT DOCUMENTS

| | | | |
|---|---|---|---|
| 4,143,197 | 3/1979 | Jasionowicy et al. | 2/97 |
| 4,450,196 | 5/1984 | Kamat | 2/272 |
| 4,490,425 | 12/1984 | Knoke et al. | 428/90 |
| 4,502,153 | 3/1985 | Lapedes et al. | 2/97 |
| 4,507,806 | 4/1985 | Coombs | 2/97 |
| 4,604,759 | 8/1986 | Bowman et al. | 2/81 |
| 4,637,947 | 1/1987 | Mackawa et al. | 428/68 |
| 4,737,396 | 4/1988 | Kamat | 428/197 |
| 5,043,209 | 8/1991 | Boisse et al. | 428/233 |
| 5,050,241 | 9/1991 | Flowers et al. | 428/198 |
| 5,054,125 | 10/1991 | Snedeker | 2/97 |
| 5,098,770 | 3/1992 | Paire | 428/198 |
| 5,136,723 | 8/1992 | Aldridge et al. | 2/97 |

*Primary Examiner*—James C. Cannon
*Attorney, Agent, or Firm*—Kane, Dalsimer, Sullivan, Kurucz, Levy, Eisele and Richard

[57] ABSTRACT

A fire-resistant composite lining for a garment includes a textile layer of heat-stable fibers and a waterproof and breathable film. The film being spot-bonded onto a face of the textile layer and intended to be on the external surface of the garment. The lining is reinforced non woven material associated with the textile layer by needle-punching and ultimately constitutes the internal surface of the garment.

16 Claims, 1 Drawing Sheet

FIRE-RESISTANT COMPOSITE LINING FOR A GARMENT

FIELD OF THE INVENTION

Techniques for manufacturing protective garments, for example for persons carrying out fire-fighting, are advancing rapidly.

The development of heat-stable fibers has led to the production and to the use of felts which constitute aerated textile layers and at the same time have good thermal insulation properties and good resistance to the transmission of flames.

Furthermore, films known as "waterproof and breathable", that is to say which are impermeable to liquid water but allow water vapor and carbon dioxide to pass through, have also been developed It has therefore become evident that the association of breathable waterproof films and heat-stable felts makes possible the production of garments which at the same time are comfortable, allow their wearer great freedom of movement, and are waterproof and very resistant to fire.

PRIOR ART

Patent Application EP-A-0 364 370, for example, describes a waterproof fire-resistant composite textile of this type.

According to the technique described in this document, the fire-resistant composite textile is positioned as an insert, in a garment, between its external surface and its lining. The insert thus being mounted in a floating manner, volumes of air are provided between this insert and the external surface of the garment on the one hand and between this same insert and the lining on the other hand. These volumes of air serve as insulator and contribute to providing fire-resistant properties to the entire garment.

A disadvantage of this arrangement is that, at the time of manufacture, the makers have to associate three elements: the external surface, the insert and the lining. This has led to relatively onerous manufacturing processes.

Ii has also been proposed to make composite inserts formed from a woven fabric and from a non-woven layer; each of the layers comprises a mixture of heat-stable fibers and wool, the proportion of wool being higher in the woven fabric than in the non-woven layer (U.S. Pat. No. 4,849,280; U.S. Pat. No. 4 937 136). These inserts are themselves not waterproof.

SUMMARY OF THE INVENTION

The aim of the invention is to propose a water-proof and breathable lining which, when it is used for the manufacture of a fire-resistant garment, provides, for a comparable quantity of heat-stable material, properties which are superior to those obtained with the use of one or more inserts, while allowing great simplicity of making-up and thus a reduction of the corresponding costs. It must likewise have good resistance to abrasion and pilling.

To this end, the invention relates to a fire-resistant composite lining for a garment, said garment having an external surface, said lining comprising:

a textile layer of heat-stable fibers comprising a first and a second face;

a waterproof and breathable film, said film being spot-bonded onto the first face of the textile layer of heat-stable fibers and being intended to be in contact with the external surface of the garment.

According to the invention, this lining comprises a reinforced nonwoven which is associated with the heat-stable textile layer by needle-punching, in contact with the second face of this layer and intended to constitute the internal surface of the garment.

The reinforced nonwoven is advantageously sewn/knitted and can also be reinforced by a knit.

According to a preferred embodiment, the layer of heat-stable fibers is non-woven and needle-punched.

Preferably, the heat-stable layer comprises aramid fibers.

In another embodiment, the heat-stable layer comprises a mixture of wool fibers treated to be flame-retardant or non-treated and of heat-stable fibers.

Preferably, the film is based on polyurethane which is flame-retarded by addition of an additive belonging to the family of nitrogen-containing and phosphorus-containing products.

Preferably, the reinforced nonwoven is itself flame-retarded.

The film is advantageously spot-bonded onto the layer of heat-stable fibers.

BRIEF DESCRIPTION OF THE DRAWINGS

The invention will be described in detail with reference to the figures, in which.

DESCRIPTION OF THE PREFERRED EMBODIMENT(S)

Figure 1:
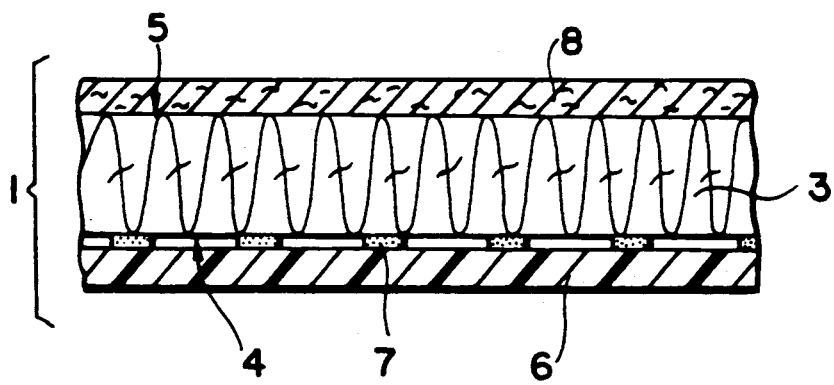
FIG. 1 is a view in cross-section of the composite lining according to the invention.
Figure 2:
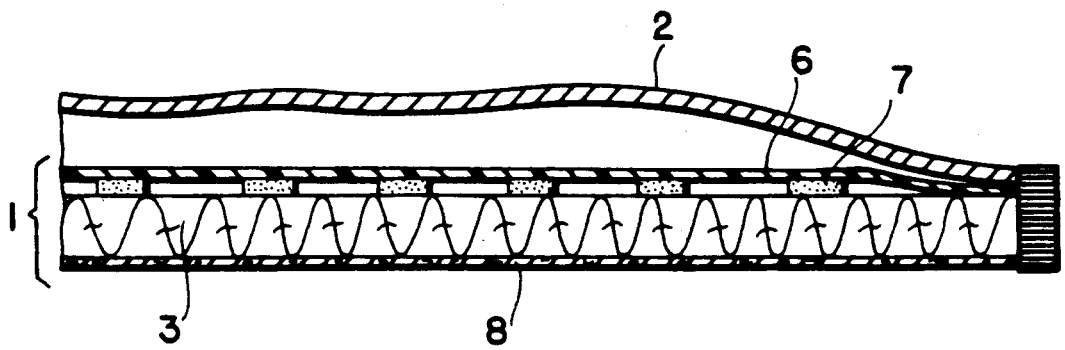
FIG. 2 is a view in partial cross-section of the lining of the invention associated with the external surface of a garment.
Figure 3:
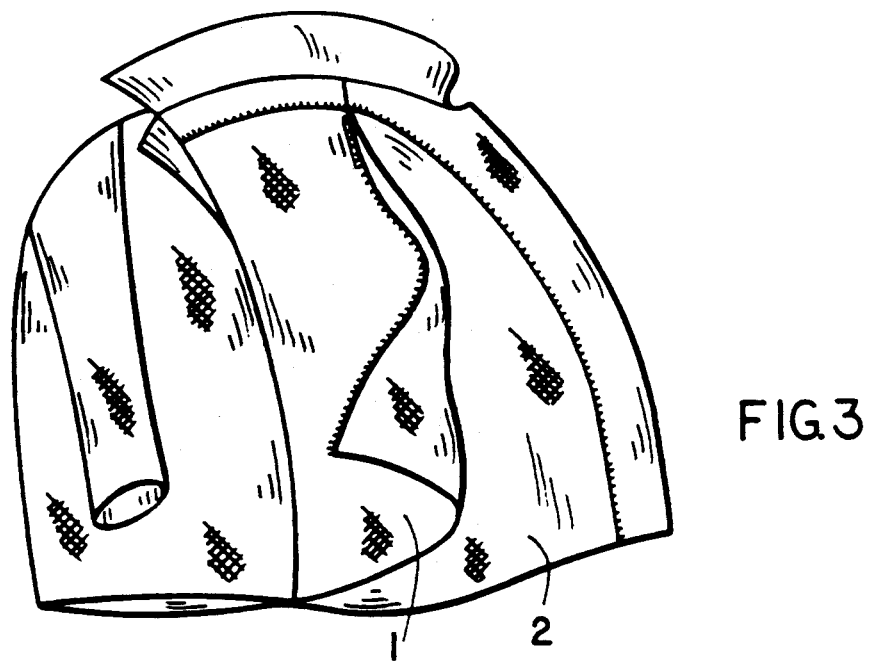
FIG. 3 is a representation of a garment comprising the lining of the invention.

The fire-resistant composite lining for a garment is constituted by a unitary composite textile which can be handled, cut, sewn, bonded etc. in a similar manner to and according to the same techniques as a single textile layer.

It consists of at least three layers.

A textile layer 3 of heat-stable fibers contributes essentially to ensuring resistance to and insulation against fire of the composite lining. It consists preferably of a felt, of a fleece or of a swollen nonwoven, which is not very dense, that is to say which, for a given mass of fibers, contains a large volume of air. It is preferably non-woven and needle-punched.

Different types of fibers known per se for their heat-stable or heat-crosslinked properties can be used to make this layer. Good results have been obtained with fibers of the aramid family, for example of polyamideimide. A mixture of wool fibers treated to be flame-retardant or non-treated and heat-stable fibers also gives very good results. In this case, the proportion by weight of wool fibers is preferably between 30% and 50%. A proportion of 40% is preferred.

Use can also be made of fibers of meta-aramid or para-aramid, polyamide-imide, polyacrylate, polybenzimidazole, aromatic copolyimide, polyacrylonitrile oxide, polyacrylate, phenylene polysulfide, polyester, polyether or polyketone, FR viscose, FR cotton or of a phenolic compound or otherwise fluorocarbon or modacrylic compounds. A mixture of these heat-stable or heat-cross-linked fibers can likewise be used.

These fibers can be either heat-stable by nature, or flame-retarded subsequently to their manufacture, for example wool can be zirpro-treated, that is to say with potassium hexafluorozirconate ($K_2ZrF_6$).

In the latter case, chlorofibers, viscoses, polyesters or wool can likewise be used.

By way of example, this heat-stable layer can advantageously be a needle-punched non-woven layer based on heat-stable fibers of polyamide-imide constituted by fibers having a staple length of 40 to 60 mm for a denier of 2.2 to 3 decitex.

Thus, for a substance of 200 g/m$^2$ and a thickness of 4 mm, this felt contains 40 to 50% air volume confined within the fibers and offers excellent thermal insulation against cold and/or fire.

The second layer of the lining of the invention is a film 6 which is preferably fixed to one of the faces, for example known as the first face, of the textile layer 3 of heat-stable fibers.

This film 6 is waterproof and breathable, that is to say it is impermeable to liquid water but allows water vapor and carbon dioxide to circulate freely. It is impermeable or has a repellent effect on hydrocarbons, acids, alkalis and solvents.

Different embodiments of this film 6 are possible.

It can be a hydrophilic film based on polyester.

It can also be a microporous film based on polyurethane.

It can also be a film based on polytetrafluoroethylene (PTFE).

This film 6 is preferably based on polyurethane which is flame-retarded by addition of a nitrogen-containing and phosphorus-containing additive.

The film 6 is preferably fixed onto the layer of heat-stable fibers 3 by spot-bonding which make it possible to maintain the breathability of the film 6 and ensures good volume and great flexibility of the whole thus constituted.

Numerous methods of bonding make this type of adhesion possible. Use can be made of thermoplastic polymers, such as polyamides, polyesters, polyurethanes, polymers which are self-crosslinkable, such as two-component polyurethanes, ethylene-acrylic acid copolymers, ethylene-acrylic ester-maleic anhydride terpolymers etc., or crosslinkable by the action of crosslinking agents incorporated into the adhesive, such as a melamine-formaldehyde resin, a urea-formaldehyde resin, a phenolformaldehyde resin, an alkali metal hydroxide, a zinc or zirconium complex, polyamines, epoxy resins, polyfunctional aziridines etc.

Preferably, the thermoadhesive polymer will itself be non-flammable. The addition of chlorinated antimony trioxide makes it possible to impart this quality to it.

The spots are deposited in the form of paste or powder or otherwise sprinkled onto the heat-stable layer 3 or onto the film 6. The association of the two layers is carried out in a conventional manner on a press.

Use can thus be made of a screen-printing coating line for spots of paste in the aqueous phase followed by a calendering line. More generally, any discontinuous bonding can be suitable.

Thus, with the aid of an 11 mesh perforated cylinder, in other words 23 holes/cm$^2$, a formulation based on crosslinkable polymer is deposited on one of the substrates, and preferably on the layer of heat-stable fibers 3.

Approximately 30 g/m$^2$ wet are deposited on the substrate at a speed of 15 to 20 m/min and there is obtained, in output from the furnace adjusted to 130° C., a dry weight of 10 to 12 g/m$^2$, onto which there is applied immediately on output from the furnace the microporous film with the aid of a cooled calender. By means of a further heat treatment at 150° C., for one minute, the definitive crosslinking of the bonding is obtained.

The heat-stable textile layer/film complex has, after 24 h rest, the desired qualities.

Bonding can also be obtained by making use of foaming, that is to say by interposing an adhesive foam between the layer of heat-stable fibers 3 on the one hand and the film 6 on the other hand.

The adhesive layer in spots 7 can also be made by spraying a liquid adhesive such as polyurethane, which is possibly capable of crosslinking. The spraying is then advantageously carried out on one of the supports, the second being applied to the first by calendering.

The adhesive layer 7 can also be made by spraying hot-melt adhesive which is crosslinkable under wet conditions and has an application temperature of 80° to 110° C. It is sprayed onto the heat-stable layer 3 or onto the film 6 with the aid of a battery of conventional guns. The second substrate is then applied to the first by cold-calendering.

The adhesive thus partially applied according to a substance of 6 to 10 g/m$^2$ crosslinks in 24 h under wet conditions and makes it possible to obtain an adhesion which is resistant to the different attentions of cleaning, and great flexibility of the complex by the spot-bonding.

It is likewise possible to make use, for making the adhesive layer by spots 7, of thermoadhesive voiles, films or meshes, onto which there are applied the heat-stable layer 3 on the one hand and the film 6 on the other hand, under a press or even simply by calendering.

The heat-stable fiber felt 3/film 6 complex has good impermeability and good resistance to fire but the layer of heat-stable fibers has low resistance to abrasion. For this reason, such a lining would be uncomfortable and would have a great tendency towards pilling.

It is generally considered that the association of a textile layer of a conventional lining with this complex contributes to improving the comfort afforded by the lining and its mechanical strength but would reduce its properties of resistance to fire and renders making-up of the garment more difficult.

It is to counter this tendency that, according to the invention, a reinforced nonwoven 8 is associated with the heat-stable textile layer 3, in contact with the second face 5 of this layer, this reinforced nonwoven being intended to constitute the internal surface of the garment.

Preferably, the reinforced nonwoven 8 is itself resistant to heat and flames (convective and radiant heat). It is for example constituted by a mixture of heat-stable fibers and wool or viscose. The proportion of wool is advantageously comprised between 50% and 80%. It is preferably 60%.

More generally, all the heat-stable fibers mentioned above as being capable of being included in the composition of the textile layer 3 can likewise be used in the composition of the reinforced nonwoven 8.

The close association of the reinforced nonwoven 8 with the layer of heat-stable fibers 3 makes it possible to give the composite lining its unitary characteristic mentioned above.

The reinforced nonwoven 8 can be sewn/knitted, that is to say manufactured by the technique known per se of sewing/knitting.

According to this technique, needles, with valves or pistons, pass through a textile fleece and form stitch wales, from bundles of fibers of the fleece or with added yarns. According to the resistance to traction and to abrasion which it is desired to give the sewn and knitted nonwoven 8, this formation of stitches is made with or without a consolidating yarn. When use is made of a consolidating yarn, it can be constituted by continuous filaments or by nets of fibers. It is advantageously made of aramid.

These techniques are known for example under the names of "MALIVLIES", "MALIWATT", "ARACHNE", "MALIMO", "SCHUSSPOL"etc.

The reinforced nonwoven can also comprise a knit formed through a non-woven fleece. In this case, the stitch wales, formed by added yarns are interconnected which gives them greater cohesion and, consequently, gives greater cohesion to the lining as a whole. This reinforcement technique is known per se under the name "RASCHEL VLIES".

This knit is advantageously picked, that is to say that the nonwoven which is reinforced by the knitted stitch yarns comprises a layer of parallel weft yarns inserted into the rows of stitches, on one side of the nonwoven. The weft yarns are advantageously heat-stable, consisting for example of 50/50 kermel-viscose in 40/60 Ms (metric size).

As a general rule, the textile layer 3 of heat-stable fibers and the reinforced nonwoven 8 are associated before the bonding of the waterproof and breathable film 6 onto the textile layer 3.

Firstly, a felt is formed by needle-punching to constitute the textile layer of heat-stable fibers.

Furthermore, a pre-needlepunched fleece is formed, which feeds a machine for sewing and knitting to form the sewn and knitted layer 8.

The textile layer 3 and the reinforced nonwoven 8 are then associated by needle-punching, by passage over a single-stroke needle-punching machine.

Substance being equal, this composite has a greater volume than the association of a needle-punched felt and a woven fabric and thus provides greater insulation against and resistance to fire.

Finally, the waterproof and breathable film 6 is spot-bonded onto the textile layer 3 of heat-stable fibers.

It is likewise possible to improve and simplify this manufacturing process by effecting on a sewing/ knitting machine the formation of the reinforced nonwoven 8 and then by associating it by needle-punching with the textile layer of heat-stable fibers which is not needle-punched. The textile layer of heat-stable fibers is then needle-punched at the same time as it is associated with the reinforced nonwoven.

The reinforced nonwoven 8 has a comfortable feel and has good resistance to abrasion and resistance to pilling even after care, cleaning and washing. It is thus suitable for constituting the internal layer of a fire-resistant garment and affords the whole of the lining of the invention its qualities of comfort and resistance to abrasion.

It is possible to use the same composition of fibers to make the heat-stable textile layer 3 and the reinforced nonwoven 8.

By way of example, the properties of a fire-resistant composite lining according to the invention are as follows: its watertightness allows it to resist a column of water of approximately 7000 mm.

The main tests are here to verify the good breathability of the complex and its impermeability with regard to water and hydrocarbons.

The water-admission pressure (hydrostatic resistance) is measured according to Federal Standard 191, method 5 512 (MULLEN test) without external fabric or lining, and a value of 650 kPa is obtained, while a value of 310 kPa is considered sufficient to ensure complete impermeability in all-weather conditions.

The breathability of a waterproof complex is determined by measuring the resistance to the transmission of wet steam according to standard DIN 54 101, part 1 and gives a resistance to the passage of water (Ret) of 0.185 $m^2 \cdot mbar/w$. According to the same standard, a value of less than 0.200 is necessary to ensure good breathability of the complex.

Chemical resistance is measured according to standard NFS 74 302 and impermeability to acids, alkalis and hydrocarbons is greater than 90%.

The index of convective protection against a flame of 1,050° C. according to standard ASTM 4 108 gives a protection index (TPP) of 40 seconds with a 40/60 PBI/para-aramid external fabric of 250 $g/m^2$ (6 $oz/yd^2$), while a leather jacket conventionally used by firefighters offers an index of 12 seconds and is two to four times heavier than a jacket made with the composite textile of the invention.

The lining of the invention makes possible, by means of simplified making-up operations, the production of all types of articles such as jackets, gloves, cagoules, trousers, overalls etc. Preferably, the stitched seams necessary for making the lining of such garments, for example shoulders, collars etc. of the jackets, are covered with impermeable strips. This makes it possible to improve the impermeability of the garment.

At the time of making-up, the lining of the invention is advantageously assembled loose in relation to the external fabric and removable, which makes it possible to employ different treatments for cleaning the lining itself on the one hand and the external surface of the garment on the other hand.

What we claim is:

1. A fire-resistant composite lining for a garment, said garment having an external surface and an internal surface, said lining comprising:
   a textile layer of heat-stable fibers comprising a first and a second face;
   a waterproof and breathable film, said film being spot-bonded onto the first face of the textile layer of heat-stable fibers and being intended to be in contact with the external surface of the garment,
   wherein said lining comprises a reinforced nonwoven which is associated with the heat-stable textile layer by needle-punching, in contact with the second face of this layer and intended to constitute the internal surface of the garment.

2. The fire-resistant composite lining as claimed in claim 1, wherein the reinforced nonwoven is sewn/knitted.

3. The fire-resistant composite lining as claimed in claim 2, wherein the reinforced, sewn/knitted nonwoven comprises added yarns.

4. The fire-resistant composite lining as claimed in claim 1, wherein the nonwoven is reinforced by a knit.

5. The fire-resistant composite lining as claimed in claim 4, wherein the nonwoven is reinforced by a knit with insertion of weft.

6. The fire-resistant composite lining as claimed in claim wherein the layer of heat-stable fibers is nonwoven and needle-punched.

7. The fire-resistant composite lining as claimed in claim 1, wherein the heat-stable layer comprises aramid fibers.

8. The fire-resistant composite lining as claimed in claim wherein the heat-stable layer comprises a mixture of wool fibers and heat-stable fibers.

9. The fire-resistant composite lining as claimed in claim 1, wherein the film is hydrophilic.

10. The fire-resistant composite lining as claimed in claim 1, wherein the film is microporous.

11. The fire-resistant composite lining as claimed in claim wherein the film is based on polytetrafluoroethylene (PTFE).

12. The fire-resistant composite lining as claimed in claim 1, wherein the film is based on polyurethane which is flame-retarded by addition of a nitrogen-containing and phosphorus-containing additive.

13. The fire-resistant composite lining as claimed in claim wherein the reinforced nonwoven comprises a mixture of heat-stable fibers and wool.

14. The fire-resistant composite lining as claimed in claim 1, wherein the reinforced nonwoven is made of cotton treated to be flame-retardant.

15. The fire-resistant composite lining as claimed in claim 1, wherein the reinforced nonwoven is made of modacrylic.

16. The fire-resistant composite lining as claimed in claim 1, wherein the spot-bonding of the film onto the heat-stable layer is carried out with a crosslinkable adhesive.

* * * * *